United States Patent

Hirakawa et al.

[11] Patent Number: 6,012,851
[45] Date of Patent: Jan. 11, 2000

[54] ROLLING BEARING

[75] Inventors: Kiyoshi Hirakawa; Akio Aoki; Kanichiro Watanabe, all of Kanagawa, Japan

[73] Assignee: NSK Ltd., Tokyo, Japan

[21] Appl. No.: 09/151,699

[22] Filed: Sep. 11, 1998

[30] Foreign Application Priority Data

Sep. 18, 1997 [JP] Japan .................................. 9-253724

[51] Int. Cl.[7] .................................................. F16C 33/62
[52] U.S. Cl. ........................... 384/569; 384/492; 384/625
[58] Field of Search ............................. 384/58, 449, 492, 384/569, 586, 625

[56] References Cited

U.S. PATENT DOCUMENTS

4,696,581  9/1987  Tsushima et al. .................. 384/569 X
4,904,094  2/1990  Furumura et al. ....................... 384/492
5,520,987  5/1996  Narai et al. .......................... 384/625 X
5,577,846 11/1996  Takahashi ............................... 384/492

Primary Examiner—Thomas R. Hannon
Attorney, Agent, or Firm—Sughrue, Mion, Zinn, Macpeak & Seas, PLLC

[57] ABSTRACT

A rolling bearing comprises a rolling element, an outer ring having an outer circumferential surface portion subjected to surface hardening and an inner circumferential surface portion acting as an orbit of the rolling element, the outer circumferential surface portion being in contact with other members so as to be used as a roll, and an inner ring having an outer circumferential surface portion acting as an orbit of the rolling element. The hardness of a core portion of the outer ring is set to be in a range of from Hv 500 to Hv 650.

11 Claims, 5 Drawing Sheets

ROLLING BEARING

BACKGROUND OF THE INVENTION

The present invention relates to a rolling bearing provided with an outer ring having an outer circumferential surface which has been subjected to surface hardening and which comes in contact with other members so that the outer ring is used as a roll.

In a steelworks or the like, there is a number of equipments or instruments using rolling elements such as a sintering machine pallet roller, a backup roller in a Sendzimir rolling mill, a chain conveyor, and so on. In these equipments or instruments, an outer ring of a bearing is used as a roll surface of a roller. In a steelworks or the like, works of various materials and temperatures are worked, so that such an outer circumferential surface of an outer ring of a bearing which comes in direct contact with the works is apt to be damaged conspicuously. Therefore, the outer circumferential surface of the outer ring of the bearing is subjected to surface treatment so as to make the outer circumferential surface have a hardness not less than a predetermined level.

However, a large load is often applied to the outer ring used as a roller, and on occasion the outer rings is broken by large shock loading or the like.

In a conventional bearing, carburized steel which is not larger than 0.23% in C% is used in the outer ring in order to prevent the outer ring from being broken, and the hardness in its core portion is made so as to be not larger than 500 in terms of Vickers hardness (Hv). Therefore, there is a problem that the outer ring is subjected to a plastic deformation so as to expand when a force exceeding the yield stress of the core portion acts on the outer ring.

In addition, about 15% to 30% by volume of retained austenite is left in the surface of carburized steel which has been ordinarily carburized, quenched and tempered. When the outer ring comes into contact with other mechanical elements, the retained austenite in the contact portion of the outer ring is decomposed so as to be transformed into martensite. The thus transformed martensite portion expands to cause a deformation such as a warp in the outer ring. There is a problem that this expansion deformation (warp) of the outer ring causes a deviation in abutment between an orbital surface of the outer ring and a rolling element. Particularly, when the outer ring bites a foreign matter such as sand or the like in its contact portion of the outer circumferential surface portion contacting with other mechanical elements, the decomposition of the retained austenite tends to be further accelerated. As a result, the life of the bearing becomes very short. Therefore, customers have made a strong request for the prolongation of the lives of bearings of this type.

SUMMARY OF THE INVENTION

The present invention has been developed to solve the foregoing problems. It is an object of the present invention to provide a rolling bearing using an outer ring as a roll, wherein expansion in the radial direction of the outer ring due to plastic deformation is hardly caused, deformation due to decomposition of retained austenite is hardly caused, and the outer ring can be prevented from cracking.

According to the present invention, a rolling bearing comprises a rolling element, an outer ring having an outer circumferential surface portion subjected to surface hardening and an inner circumferential surface portion acting as an orbit of the rolling element, the outer circumferential surface portion being in contact with other members so as to be used as a roll, and an inner ring having an outer circumferential surface portion acting as an orbit of the rolling element, wherein the hardness of a core portion of the outer ring is set to be in a range of from 500 to 650 both inclusive in terms of Vickers hardness (Hv)

DETAILED DESCRIPTION OF THE PREFERRED EMBODIMENTS

Hereinafter, description will be made about a preferred embodiment of the present invention with reference to the accompanying drawings and table.

Figure 4:
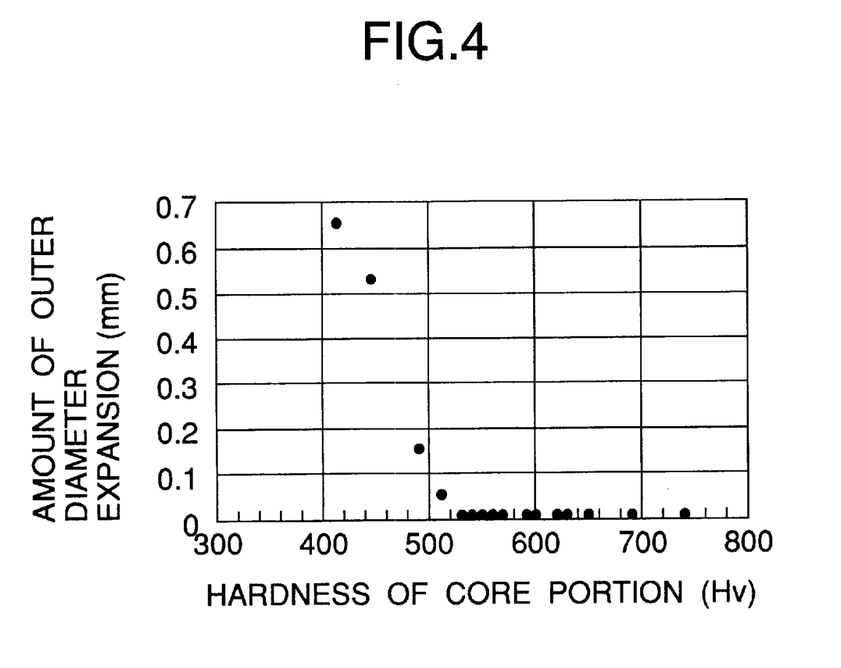
FIG. 4 shows a graph showing the relationship between the hardness (Hv) of a core portion and the amount of outer diameter expansion (mm) of the outer ring.
Figure 6:
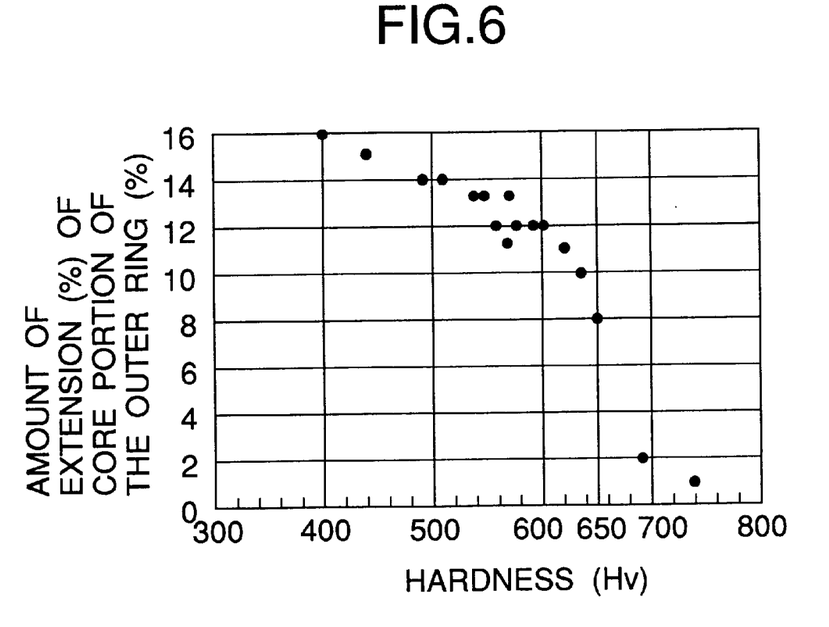
FIG. 6 shows a graph showing the relationship between the hardness (Hv) and the amount of extension (%) of the core portion of the outer ring.

The amount of expansion of the outer diameter of the outer ring becomes substantially zero when the hardness of a core portion of the outer ring is Hv 500 or more as shown in FIG. 4. Therefore, the hardness of the core portion of the outer ring is made to be Hv 500 or more. On the other hand, the extension of the core portion is large when the hardness of the core portion of the outer ring is not more than Hv 650 as shown in FIG. 6. Therefore, the hardness of the core portion of the outer ring is made to be Hv 650 or less.

Figure 5:
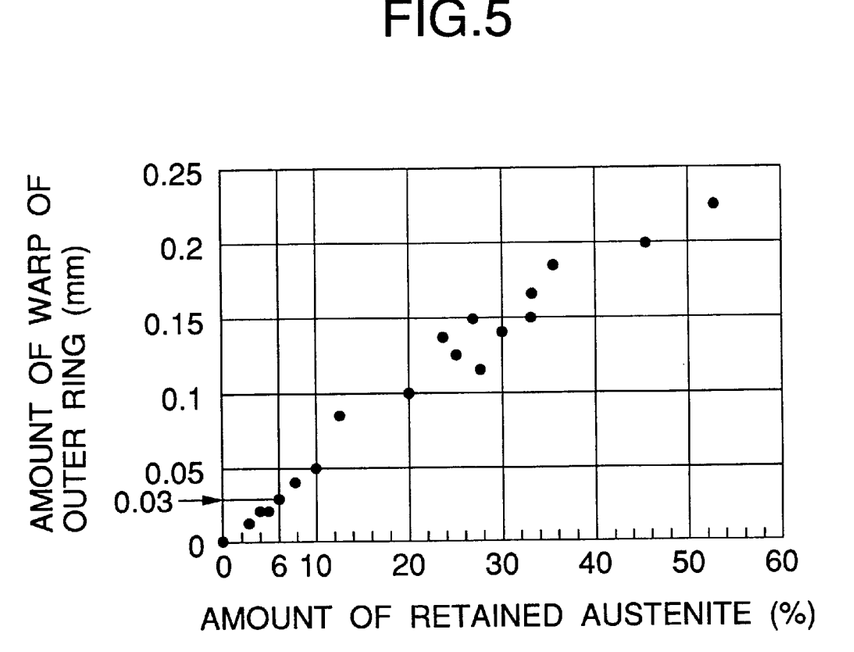
FIG. 5 shows a graph showing the relationship between the amount of retained austenite (%) and the amount of warp (mm) of the outer ring.

It is preferable that the amount of retained austenite in the outer circumferential surface portion of the outer ring is made to be not more than 10% by volume, more preferably, not more than 6% by volume. The amount of warp of the outer ring becomes small sufficiently when the amount of retained austenite in the outer circumferential surface portion of the outer ring is not more than 10% by volume as shown in FIG. 5. It is therefore preferable that the amount of retained austenite in the outer circumferential surface portion of the outer ring is made to be not more than 10% by volume.

Figure 8:
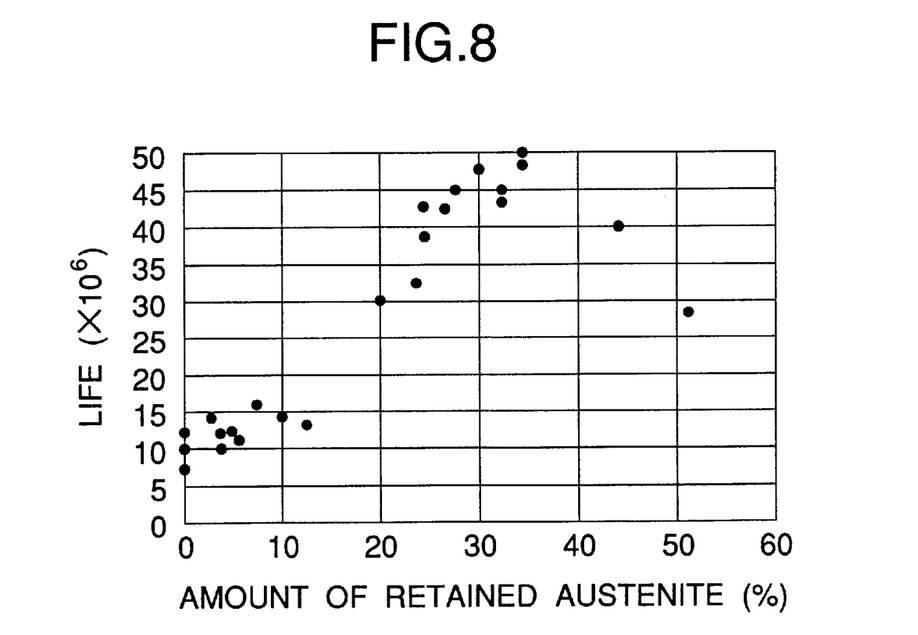
FIG. 8 shows a graph showing the relationship between the amount of retained austenite (%) and the life ($1 \times 10^6$ hour) of the outer ring.

Further, it is preferable that the amount of retained austenite in an inner circumferential surface portion (orbital surface portion) of the outer ring is set to be in a range of from 20% by volume to 50% by volume, more preferably, in a range of from 25% by volume to 40% by volume. The life of the bearing becomes long when the amount of retained austenite in the inner circumferential surface portion (orbital surface portion) of the outer ring is set to be in a range of from 20% by volume to 50% by volume as shown in FIG. 8. It is therefore preferable that the amount of retained austenite in the inner circumferential surface portion (orbital surface portion) of the outer ring is set to be in this range.

Figure 7:
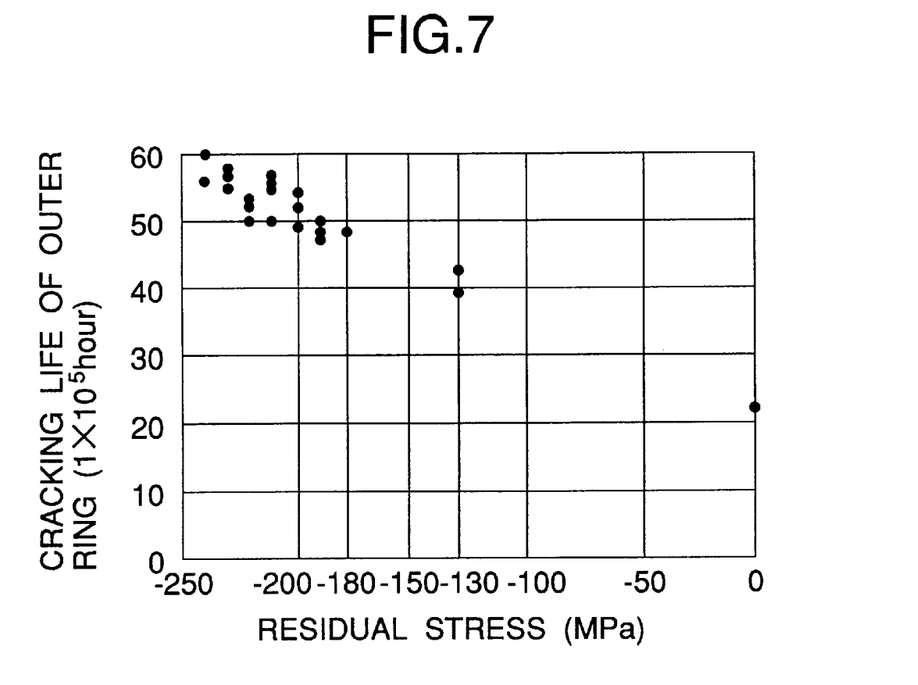
FIG. 7 shows a graph showing the relationship between the residual stress (Mpa) and the cracking life ($1 \times 10^5$ hour) of the outer ring.

Further, it is preferable that the retained compressive stress of the inner circumferential surface portion (orbital surface portion) of the outer ring is made to be not less than 130 Mpa, more preferably, not less than 180 Mpa. The cracking life of the outer ring becomes long when the retained compressive stress of the inner circumferential surface portion (orbital surface portion) of the outer ring is set to be not less than 130 Mpa as shown in FIG. 7. It is therefore preferable that the retained compressive stress of the inner circumferential surface portion (orbital surface portion) of the outer ring is made to be not less than 130 Mpa.

However, it is not always necessary to set a limit in the hardness of the core portion when a load applied to the outer ring is so small that no plastic deformation is caused in the core portion, or when there is no fear that cracking is produced in the outer ring by shock loading or the like. Then, it will go well if the amount of the retained austenite in the outer circumferential surface is made to be not more than 10% by volume (preferably, not more than 6% by volume), the amount of the retained austenite in the orbital surface is made to be in a range of from 20% by volume to 50% by volume, and the retained compressive stress is made to be not less than 130 Mpa.

When the hardness of the core portion of the outer ring, the amount of the retained austenite in the outer circumferential surface portion of the outer ring, and the retained compressive stress in the inner circumferential surface portion of the outer ring are made to be in the above-mentioned numerical ranges respectively, various properties of the outer ring, such as the amount of expansion, the amount of warp, the extension of the core portion, and so on are improved more greatly, and the cracking life of the outer ring is prolonged on a large scale. Accordingly, the life of the bearing as a whole is prolonged on a large scale.

EXAMPLES

Hereinafter, preferred examples according to the present invention will be described with reference to the accompanying drawings and tables.

As for outer rings used in Examples, carburizing or carbonitriding was given to alloy steel defined in JIS as shown in Table 1, and then, tempering was performed thereon at tempering temperature shown in Table 1, so that the amount of retained austenite in an outer circumferential surface of each outer ring was adjusted to a predetermined value.

Further, in the Examples 3, 17 and 24, after the outer ring was once tempered at a temperature of 180° C., oil at a temperature of 150° C. which was not beyond the tempering temperature was supplied onto the inner circumferential surface (orbital surface) of the outer ring in order to cool the inner circumferential surface (orbital surface) of the outer ring. While the tempering of the inner circumferential surface (orbital surface) was prevented from proceeding by supplying such as cooling oil, the outer circumferential surface was tempered by use of induction heating to thereby reduce the amount of retained austenite in the outer circumferential surface of the outer ring to a predetermined value. The reason why oil at a temperature of 150° C. was used was for controlling a temperature difference between the outer circumferential surface and the inner circumferential surface (orbital surface) properly because the outer ring was somewhat thin. Water cooling may be used when the outer ring is thick. A core controlled in temperature may be used for cooling the inner circumferential surface (orbital surface).

Figure 1:
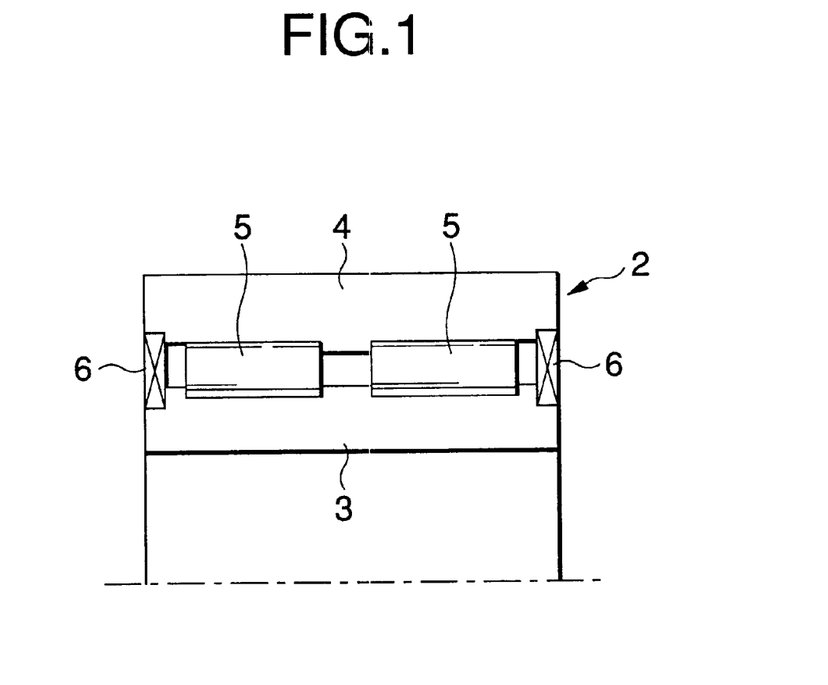
FIG. 1 shows a partially cutaway and partially expanded sectional view illustrating a rolling bearing having an outer ring used as a roll.
Figure 2:
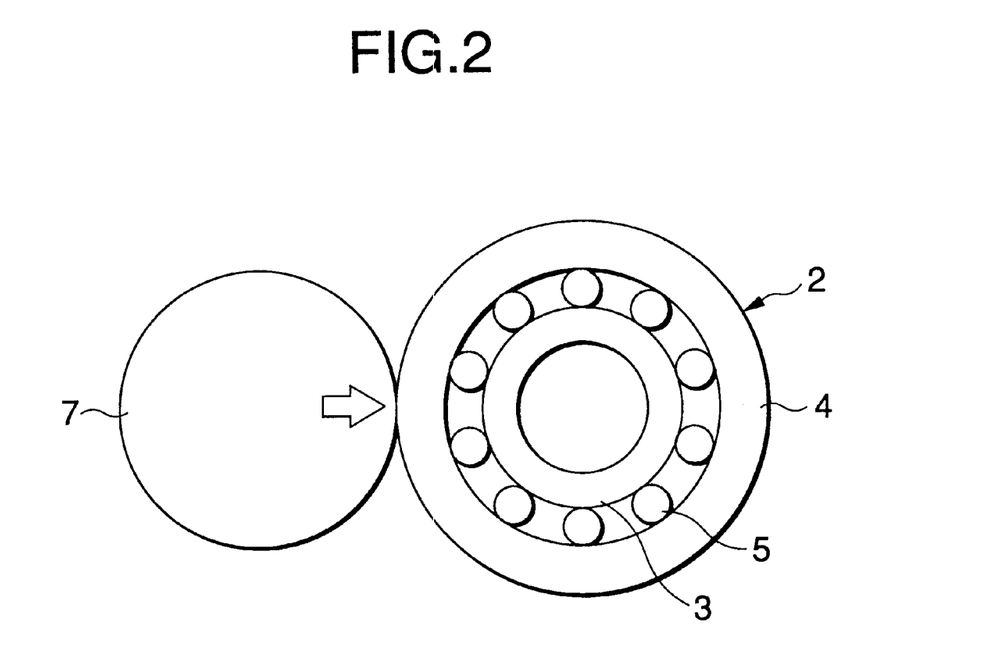
FIG. 2 shows a view illustrating the outline of an outer ring roll testing machine.

By using an outer ring roll bearing testing machine shown in FIG. 2, a drum test was performed upon the outer ring 4 shown in FIG. 1. Then, steel types and heat treatments shown in Table 1 were applied to the outer ring 4. FIG. 4 shows the results of measuring the amount of expansion (mm) of the outer diameter of the outer ring. In addition, FIG. 5 shows the results of measuring the amount of warp (mm) of the outer ring. It was proved that the amount of expansion of the outer diameter became 0.05 mm or less with no problem in practical use as the increase of bearing clearance when the hardness of the core portion of the outer ring was Hv 500 or more, and the expansion of the outer ring was hardly caused when the hardness was Hv 530 or less.

On the other hand, as shown in FIG. 6, the extension (%) of the core portion of the outer ring begins to decrease when the hardness of the core portion is not smaller than Hv 600. When the hardness was more than Hv 650, the extension decreased suddenly, so that the resistance to shock loading was reduced. It was therefore proved that the range of the hardness of the core portion of the outer ring in which the outer diameter of the outer ring did not expand, and the resistance to shock loading was not reduced, was in a range of from Hv 500 to Hv 650 (preferably, from Hv 530 to Hv 600).

As shown in FIG. 5, it was proved that the amount of warp (mm) of the outer ring was increased with the increase of the amount of retained austenite (% by volume) in the outer diameter surface. Although the amount of warp up to 0.05 mm and the amount of retained austenite up to 10% by volume are allowed when suitable crowning is given to the roller 5, the amount of warp of the outer ring is preferably made to be not more than 0.03 mm, and the amount of retained austenite is preferably made to be not more than 6% by volume. The amount of retained austenite herein means an amount of retained austenite up to a half of the depth of a surface-hardened layer.

In the test using an outer ring fatigue-cracking testing machine shown in FIG. 2, cracking of the outer ring was produced on the orbital surface side of the outer ring. As shown in FIG. 7, the cracking strength of the outer ring is proportional to the residual stress in the orbital surface portion of the outer ring, and the strength is regarded as sufficient on practical use if the residual compressive stress of 130 Mpa or more exists in the orbital surface portion. In this case, particularly, the cracking strength shows a large value under the existence of the residual compressive stress of 180 Mpa or more. Therefore, the residual compressive stress of the orbital surface portion is more important than the hardness of the core portion in order to improve the fatigue-cracking strength of the outer ring.

As shown in FIG. 8, the rolling life increased when the amount of retained austenite in the orbital surface portion of the outer ring was 20% by volume or more in a rolling life test under the condition that foreign matters were mixed. However, it was proved that the rolling life was lowered when the amount of retained austenite was more than 50% by volume because the hardness of the orbital surface portion was lowered.

In an outer ring roll bearing test, a plurality of cylindrical rolling bearings 2 each having an outer ring 4 (an outer diameter of 200 mm, a width of 120 mm, and an orbital surface diameter of 150 mm) manufactured by the materials and heat treatment in Table 1 were used as test bearings (an inner diameter of 100 mm) shown in FIG. 1. By using a testing machine having a load roller 7 shown in FIG. 2, the test was performed under the conditions that a test load was 20 ton, a rotation speed was 500 rpm, a test temperature was 40° C., and lubricating oil of VG 60 was mixed with 300 ppm of iron powder having the hardness of Hv 540 and the average particle size of 100 μm. The amount of expansion and the amount of warp of the outer diameter of the bearings 2 after 50 hours were measured. The results are shown in FIG. 4 and FIG. 5, respectively.

Figure 3:
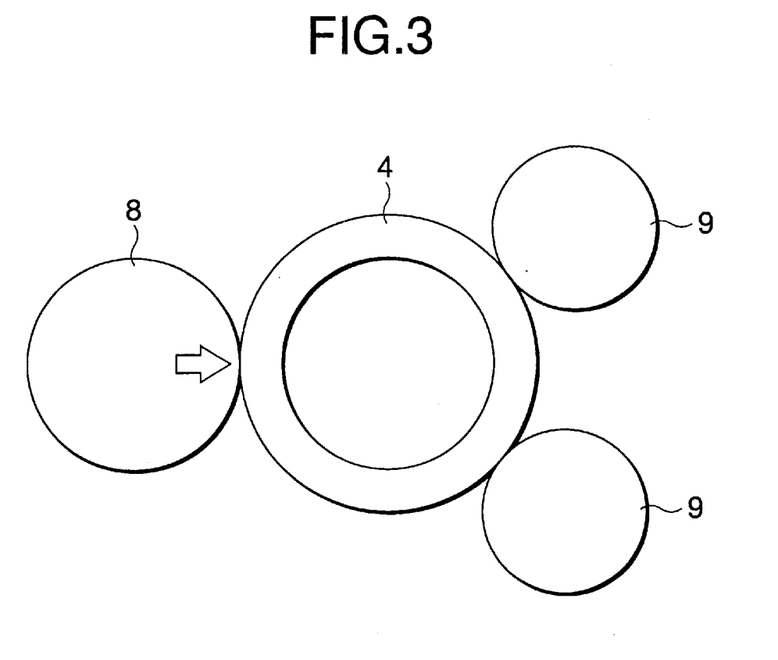
FIG. 3 shows a view illustrating the outline of an outer ring fatigue-cracking testing machine.

A ring having an outer diameter of 120 mm, an inner diameter of 96 mm, and a width of 25 mm manufactured by the materials and heat treatment in Table 1 was used as a specimen for an outer ring cracking test. The test was performed until the outer ring 4 was cracked out by using a testing machine having load rollers 8 and 9 shown in FIG. 3, under the conditions of a test load of 3 ton, a rotation speed of 1,500 rpm, a test temperature of 40° C., and lubricating oil of VG 60. This result is shown in FIG. 7.

A rolling life test was performed, by using a thrust-type life testing machine described in "Special Steel Handbook", the first edition (edited by Denki Seiko Kenkyusho, Rikogakusha, May 25, 1969), pp. 0–12, and by using a disc TP having an outer diameter of 60 mm, and a thickness of 6 mm, and manufactured by the materials and heat treatment in Table 1. The test was performed under the conditions of loading condition of Pmax=4,900 Mpa, a main shaft rotation speed of 1,000 rpm, a test temperature of 40° C., and lubricating oil of VG 60 mixed with 100 ppm of iron powder having the hardness of Hv 540 and the average particle size of 100 μm.

Figure 9:
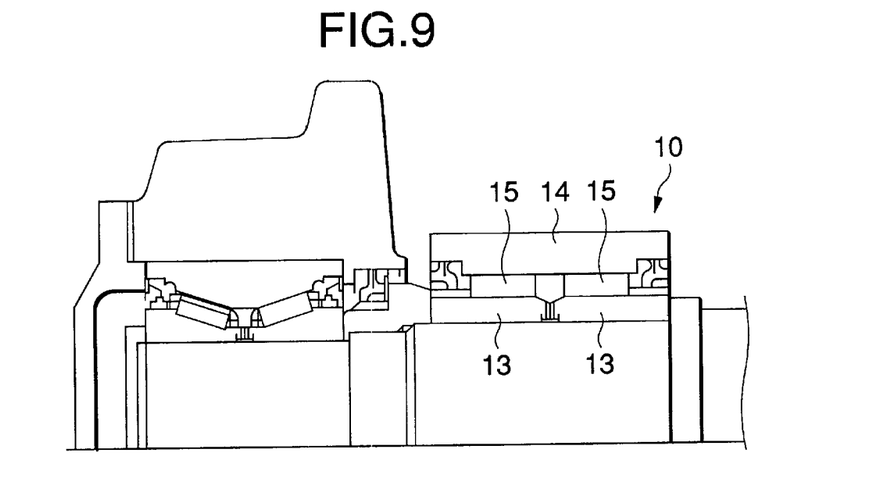
FIG. 9 shows a partially sectional view illustrating a bearing portion of a palette roller of a sintering machine.

FIG. 9 shows a bearing portion of a pallet roller 10 of a sintering machine. The reference numeral 13 represents an inner ring; 14, an outer ring; and 15, a roller.

Figure 10:
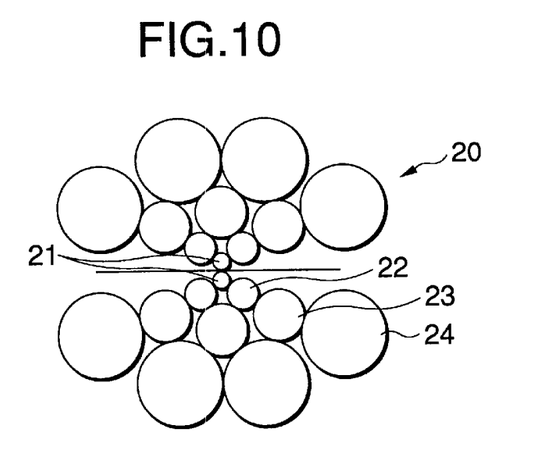
FIG. 10 shows a diagram illustrating the outline of a roller for a Sendzimir rolling mill.

FIG. 10 schematically shows a roller of a Sendzimir rolling mill 20. The reference numeral 21 represents a work roller; 22, 23 and 24, rolling bearings (not shown) according to the present invention, having the outer rings as rolls.

Figure 11:
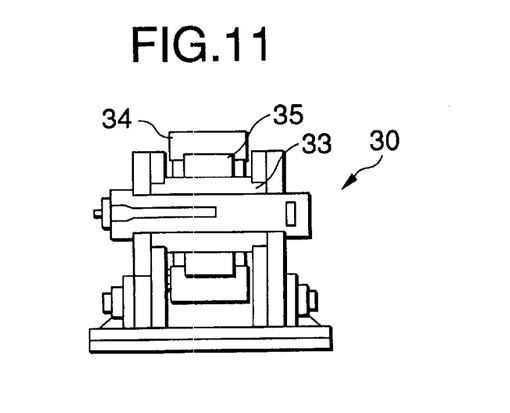
FIG. 11 shows a partially sectional view illustrating a bearing portion of a chain conveyor.

FIG. 11 shows a bearing portion of a chain conveyor 30. The reference numeral 33 represents an inner ring; 34, an outer ring; and 35, a roller.

TABLE 1

(1/3)

| No. | steel kind | Carburizing Carbonitriding | Quenching (°C.) | tempering (°C.) | surface C% | surface N% | core C% |
|---|---|---|---|---|---|---|---|
| 1 | SNCM220 | Carburizing | 820 | 180 | 0.95 | 0.01 | 0.21 |
| 2 | SNCM815 | Carbonitriding | 820 | 180 | 0.85 | 0.18 | 0.16 |
| 3 | SNCM815 | Carbonitriding | 820 | 180 and induction heating | 0.95 | 0.27 | 0.16 |
| 4 | SNCM625 | Carbonitriding | 820 | 180 | 0.87 | 0.21 | 0.28 |
| 5 | SNCM625 | Carbonitriding | 820 | 260 | 0.87 | 0.21 | 0.28 |
| 6 | SNCM630 | Carbonitriding | 820 | 180 | 0.93 | 0.25 | 0.31 |
| 7 | SNCM630 | Carbonitriding | 820 | 260 | 0.93 | 0.25 | 0.31 |
| 8 | SNCM439 | Carburizing | 820 | 180 | 1.08 | 0.01 | 0.41 |
| 9 | SNCM439 | Carbonitriding | 820 | 180 | 1.08 | 0.27 | 0.41 |
| 10 | SNCM439 | Carbonitriding | 860 | 180 | 1.08 | 0.27 | 0.41 |
| 11 | SNCM439 | Carbonitriding | 880 | 180 | 1.08 | 0.27 | 0.41 |
| 12 | SNCM439 | Carbonitriding | 820 | 230 | 1.08 | 0.27 | 0.41 |
| 13 | SNCM439 | Carbonitriding | 820 | 260 | 1.08 | 0.27 | 0.41 |
| 14 | SNCM439 | Carbonitriding | 820 | 280 | 1.08 | 0.27 | 0.41 |
| 15 | SNCM439 | Carbonitriding | 860 | 280 | 1.08 | 0.27 | 0.41 |
| 16 | SNCM439 | Carbonitriding | 880 | 280 | 1.08 | 0.27 | 0.41 |
| 17 | SNCM439 | Carbonitriding | 820 | 180 and induction heating | 1.08 | 0.27 | 0.41 |
| 18 | SNCM447 | Carbonitriding | 820 | 180 | 0.94 | 0.2 | 0.48 |
| 19 | SNCM447 | Carbonitriding | 820 | 260 | 0.94 | 0.2 | 0.48 |
| 20 | SKT4 | Carbonitriding | 840 | 180 | 0.95 | 0.24 | 0.55 |
| 21 | SKT4 | Carbonitriding | 840 | 230 | 0.95 | 0.24 | 0.55 |
| 22 | SKT4 | Carbonitriding | 840 | 260 | 0.95 | 0.24 | 0.55 |
| 23 | SUJ3 | Carbonitriding | 820 | 180 | 1.28 | 0.18 | 1.02 |
| 24 | SUJ3 | Carbonitriding | 820 | 180 and induction heating | 1.28 | 0.18 | 1.02 |
| 25 | SUJ3 | | 820 | 180 | 1.02 | 0.01 | 1.02 |

(2/3)

| No. | Hardness orbital surface (Hv) | Hardness Outer diameter surface (Hv) | Hardness core portion (Hv) | retained austenite orbital surface (%) | retained austenite outer diameter surface (%) | residual stress orbital surface Mpa |
|---|---|---|---|---|---|---|
| 1 | 730 | 730 | 440 | 24 | 24 | −210 |

TABLE 1-continued (1/3)

| No. | steel kind | Carburizing Carbonitriding | Quenching (°C.) | tempering (°C.) | surface C% | surface N% | core C% |
|---|---|---|---|---|---|---|---|
| 2 | 750 | 750 | 410 | 20 | 20 | | −230 |
| 3 | 780 | 690 | 410 | 35 | 0 | | −230 |
| 4 | 750 | 750 | 530 | 25 | 25 | | −220 |
| 5 | 710 | 710 | 490 | 4 | 4 | | −200 |
| 6 | 770 | 770 | 560 | 33 | 33 | | −240 |
| 7 | 730 | 730 | 510 | 3 | 3 | | −210 |
| 8 | 740 | 740 | 620 | 27 | 27 | | −210 |
| 9 | 780 | 780 | 620 | 35 | 35 | | −230 |
| 10 | 740 | 740 | 620 | 45 | 45 | | −240 |
| 11 | 710 | 710 | 620 | 52 | 52 | | −220 |
| 12 | 750 | 750 | 590 | 8 | 8 | | −210 |
| 13 | 730 | 730 | 560 | 6 | 6 | | −200 |
| 14 | 700 | 700 | 540 | 0 | 0 | | −190 |
| 15 | 720 | 720 | 550 | 0 | 0 | | −200 |
| 16 | 730 | 730 | 560 | 0 | 0 | | −190 |
| 17 | 780 | 690 | 600 | 35 | 0 | | −230 |
| 18 | 770 | 770 | 630 | 30 | 30 | | −220 |
| 19 | 730 | 730 | 570 | 5 | 5 | | −200 |
| 20 | 780 | 780 | 690 | 33 | 33 | | −210 |
| 21 | 750 | 750 | 650 | 10 | 10 | | −190 |
| 22 | 730 | 730 | 600 | 4 | 4 | | −180 |
| 23 | 780 | 780 | 740 | 28 | 28 | | −130 |
| 24 | 780 | 780 | 740 | 25 | 4 | | −130 |
| 25 | 740 | 740 | 740 | 13 | 13 | | 0 |

(3/3)

| No. | outer ring roll test outer diameter expansion (mm) | outer ring roll test outer diameter warp (mm) | rolling life $\times 10^6$ | cracking life $\times 10^5$ | tensile elongation (%) |
|---|---|---|---|---|---|
| 1 | 0.53 | 0.13 | 32 | 56 | 15 |
| 2 | 0.65 | 0.1 | 30 | 55 | 16 |
| 3 | 0.65 | 0 | 48 | 57 | 16 |
| 4 | 0.01 | 0.12 | 38 | 50 | 13 |
| 5 | 0.15 | 0.02 | 10 | 52 | 14 |
| 6 | 0.01 | 0.16 | 43 | 60 | 13 |
| 7 | 0.05 | 0.01 | 14 | 57 | 14 |
| 8 | 0.01 | 0.15 | 42 | 55 | 11 |
| 9 | 0.01 | 0.18 | 50 | 58 | 11 |
| 10 | 0.01 | 0.2 | 40 | 56 | 11 |
| 11 | 0.01 | 0.22 | 28 | 52 | 11 |
| 12 | 0.01 | 0.04 | 16 | 55 | 12 |
| 13 | 0.01 | 0.03 | 11 | 54 | 13 |
| 14 | 0.01 | 0 | 7 | 50 | 13 |
| 15 | 0.01 | 0 | 10 | 52 | 12 |
| 16 | 0.01 | 0 | 12 | 48 | 11 |
| 17 | 0.01 | 0 | 48 | 57 | 12 |
| 18 | 0.01 | 0.14 | 47 | 53 | 10 |
| 19 | 0.01 | 0.02 | 12 | 49 | 12 |
| 20 | 0.01 | 0.15 | 45 | 50 | 2 |
| 21 | 0.01 | 0.05 | 14 | 47 | 8 |
| 22 | 0.01 | 0.02 | 12 | 48 | 12 |
| 23 | 0.01 | 0.11 | 45 | 39 | 1 |
| 24 | 0.01 | 0.02 | 42 | 42 | 1 |
| 25 | 0.01 | 0.08 | 13 | 22 | 1 |

According to the present invention, since the hardness of a core portion of an outer ring used as a roll is made to be in a range of from not less than Hv 500 to not more than 650, a plastic deformation of the outer ring can be prevented. In addition, the amount of retained austenite in an outer circumferential surface is made to be not more than 10% by volume, so that a warp of the outer ring can be prevented. In addition, residual compressive stress not less than 130 Mpa is formed in an orbital surface of the outer ring so as to prolong the cracking life of the outer ring on a large scale. Further, retained austenite of not less than 20% by volume is formed in an inner circumferential surface of the outer ring so as to prolong the rolling life of the orbital surface of the outer ring on a large scale.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing comprising:
  a rolling element;

an outer ring having an outer circumferential surface portion subjected to surface hardening and an inner circumferential surface portion acting as an orbit of said rolling element, said outer circumferential surface portion of the outer ring being in contact with other members so as to be used as a roll; and an inner ring having an outer circumferential surface portion acting as an orbit of said rolling element, wherein the hardness of a core portion of said outer ring is set to be in a range of from 500 to 650 both inclusive in terms of Vickers hardness (Hv).

2. The rolling bearing according to claim 1, wherein an amount of retained austenite in the inner circumferential surface portion of the outer ring is set to be in a range of from 20% by volume to 50% by volume.

3. The rolling bearing according to claim 2, wherein an amount of retained austenite in the inner circumferential surface portion of the outer ring is set to be in a range of from 25% by volume to 50% by volume.

4. The rolling bearing according to claim 1, wherein a retained compressive stress of the inner circumferential surface portion of the outer ring is made to be not less than 130 Mpa.

5. The rolling bearing according to claim 4, wherein a retained compressive stress of the inner circumferential surface portion of the outer ring is made to be not less than 180 Mpa.

6. A rolling bearing comprising:

a rolling element;

an outer ring having an outer circumferential surface portion subjected to surface hardening and an inner circumferential surface portion acting as an orbit of said rolling element, said outer circumferential surface portion being in contact with other members so as to be used as a roll; and an inner ring having an outer circumferential surface portion acting as an orbit of said rolling element, wherein an amount of retained austenite in the outer circumferential surface portion of the outer ring is made to be not more than 10% by volume.

7. The rolling bearing according to claim 6, wherein an amount of retained austenite in the inner circumferential surface portion of the outer ring is set to be in a range of from 20% by volume to 50% by volume.

8. The rolling bearing according to claim 7, wherein an amount of retained austenite in the inner circumferential surface portion of the outer ring is set to be in a range of from 25% by volume to 50% by volume.

9. The rolling bearing according to claim 6, wherein a retained compressive stress of the inner circumferential surface portion of the outer ring is made to be not less than 130 Mpa.

10. The rolling bearing according to claim 9, wherein a retained compressive stress of the inner circumferential surface portion of the outer ring is made to be not less than 180 Mpa.

11. The rolling bearing according to claim 6, wherein an amount of retained austenite in the outer circumferential surface portion of the outer ring is made to be not more than 6% by volume.

* * * * *